No. 845,100. PATENTED FEB. 26, 1907.
E. G. KOHOUT.
APPARATUS FOR REMOVING SNOW FROM STREETS.
APPLICATION FILED AUG. 30, 1906.
2 SHEETS—SHEET 2.
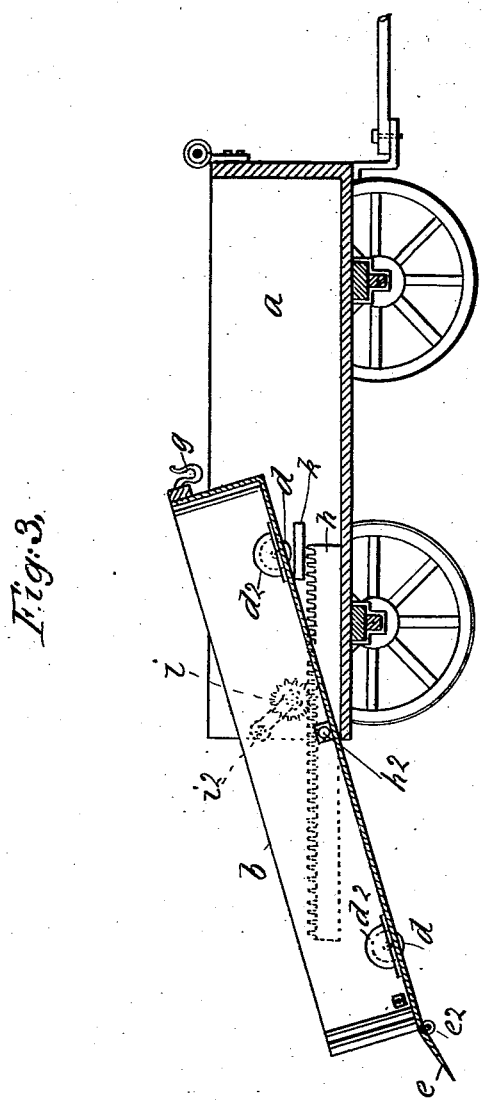

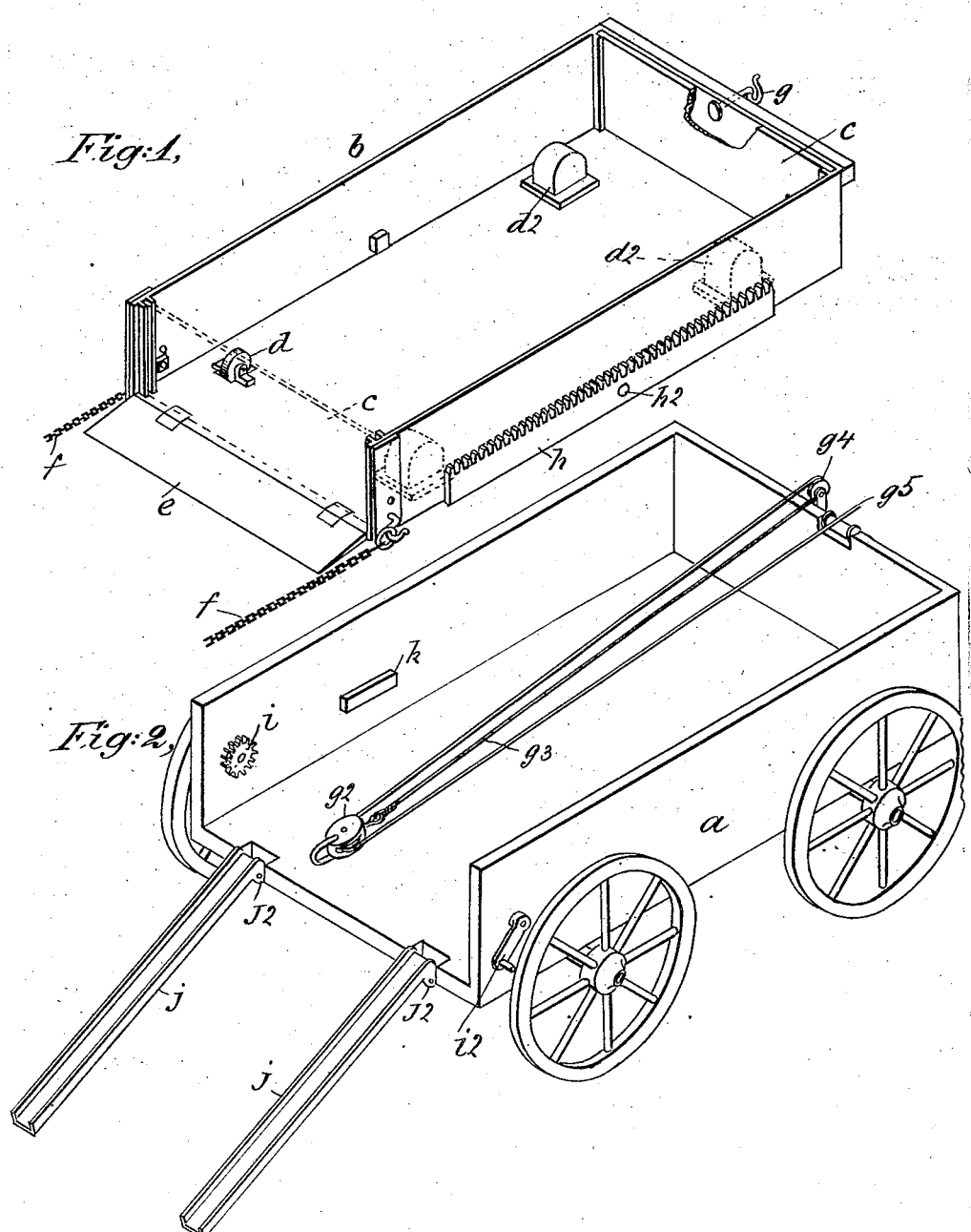

UNITED STATES PATENT OFFICE.

EMANUEL G. KOHOUT, OF NEW YORK, N. Y.

APPARATUS FOR REMOVING SNOW FROM STREETS.

No. 845,100.  Specification of Letters Patent.  Patented Feb. 26, 1907.

Application filed August 30, 1906. Serial No. 332,581.

*To all whom it may concern:*

Be it known that I, EMANUEL G. KOHOUT, a citizen of the United States, and residing at New York, in the county of New York and State of New York, have invented certain new and useful Improvements in Apparatus for Removing Snow from Streets, of which the following is a specification, such as will enable those skilled in the art to which it appertains to make and use the same.

The object of this invention is to provide improved means or apparatus for removing snow from streets; and the invention involves a drag which is box-shaped in form and open at one end and adapted to be drawn along the street by a team and to gather the snow in the manner of a scoop, said drag when filled being adapted to be drawn onto a wagon by which it is transported to the required dumping-place, and the invention also involves means whereby the drag while on the wagon, may be conveniently manipulated for dumping the snow therefrom.

The invention is fully disclosed in the following specification, of which the accompanying drawings form a part, in which the separate parts of my improvement are designated by suitable reference characters in each of the views, and in which—

Figure 1 is a perspective view of the drag which forms a part of my invention; Fig. 2, a similar view of a wagon in connection with which the drag is used, and Fig. 3 a longitudinal section of the wagon and the drag and showing the method of dumping the contents of the drag.

In the practice of my invention I provide a wagon, which is shown in Fig. 2 and provided with a bed or body $a$ the rear end of which is opened, and the said wagon or the bed or body thereof may be of any desired dimensions. I also provide a scoop-drag $b$, which is of the same shape as the bed or body $a$ of the wagon, but of less transverse dimensions, to permit of its being drawn into the rear end of said bed or body. The drag $b$ is open at one end and provided with a removable end-board $c$, which may be taken out and placed at the closed end of said drag in suitable keepers prepared therefor, as shown in Fig. 1, when said drag is being filled with snow and again placed in position to close the rear end of the drag when the latter is filled, as indicated in dotted lines in Fig. 1. The bottom of the drag $b$ is also provided at its opposite sides with wheels or rollers $d$, which are mounted therein longitudinally thereof and which extend through the bottom thereof and on which the drag rests when it is being drawn along the ground or along the street.

In the construction shown the open end of the drag is provided at the bottom thereof with a projecting blade member $e$, which projects a predetermined distance therefrom and which serves as a shovel to scoop up the snow when the drag is pulled along the street and direct it back into said drag, and the said end of the drag is also provided with chains or other attaching devices $f$, by means of which a team may be hitched to the said drag.

The wheels $d$ are provided with covers $d^2$, which prevent the snow or other material from coming in contact with said wheels, and at the closed end of the drag is a hook or other device $g$, and in practice a block-and-tackle arrangement (shown in Fig. 2) is adapted to be connected with the hook or other device $g$ to pull the drag into the wagon, said block-and-tackle device comprising a block $g^2$, adapted to be connected with the hook or other device $g$, a rope $g^3$, connected therewith, and a pulley $g^4$, connected with the front end of the wagon bed or body, and whenever it is desired to pull the drag onto or into the wagon a team is hitched to the free end $g^5$ of the rope $g^3$ for this purpose.

The opposite sides of the drag $b$ are also provided with rack-bars $h$, which are pivoted at $h^2$ forwardly of the middle of said drag, and the opposite sides of the wagon bed or body are provided with sprocket or gear wheels $i$, which operate in connection with said rack-bars and the shafts of which are provided with cranks $i^2$.

In practice the drag is pulled along the street until it is filled with snow, the snow passing backwardly thereinto, as will be readily understood, and, if necessary, the snow may be shoveled from the open end of the drag into the other end thereof. When the drag is filled with snow, the wagon is placed in proper position relative thereto, the block $e^2$ is connected with the hook or other attaching device $g$, and the drag is pulled into the wagon bed or body over inclined tracks or ways $j$, with which the open rear end of the wagon bed or body is provided, and in this operation the wheels or rollers $d$ in the opposite side portions of the bottom of the drag move in the tracks or ways $j$, and said tracks or ways are made U-shaped in crosssection, so as to hold said wheels or rollers therein.

The tracks or ways $j$ may be connected with the bed or body of the wagon at $j^2$ in any desired manner; but I prefer to make this connection so that the said tracks or ways may be detached and placed in the bed or body when not in use.

When the drag has been pulled into the bed or body of the wagon, as herein described, the wagon is transported to the desired dumping-place, and the gear-wheels $i$ are manipulated by means of the cranks $i^2$, so as to run the drag back into the position shown in Fig. 3, in which position the rear end of the drag drops downwardly and the snow is dumped therefrom, the end-board $c$ being first removed. In this operation the rack-bars $h$ remain in a horizontal position, and by turning the wheels $i$ in the reversed direction the drag may be forced back into the wagon bed or body and again transported to the desired place and again filled with snow in the manner hereinbefore described.

The blade member $e$, which is connected with the bottom portion of the drag, is preferably secured to said bottom portion by means of hinges, as shown at $e^2$, in which case the edge thereof will rest on the surface of the street; but my invention is not limited to any particular means for securing said member to the bottom of the drag, and, if desired, the bottom of the drag may itself be provided with a sharp or beveled edge, and the part $e$ may be omitted.

The opposite sides of the bed or body $a$ of the wagon are provided with horizontally-arranged stops or keepers $k$, which hold the rack-bars $h$ in a horizontal position when projected rearwardly, as shown in Fig. 3; but my invention as herein shown and described is not limited to any particular means for holding said rack-bars in position nor for operating the drag in order to dump the same, and various changes in and modifications of the construction of my improved apparatus as herein shown and described may be made without departing from the spirit of my invention as indicated by the appended claims.

Having fully described my invention, what I claim as new, and desire to secure by Letters Patent, is—

1. In an apparatus for removing snow from streets, a scoop-drag adapted to be drawn along the street, said scoop-drag being box-shaped in form and open at one end and provided with wheels or rollers in the bottom thereof, and a wagon having a bed or body open at the rear end, and means whereby the scoop-drag may be drawn into said bed or body and devices for dumping said drag at the rear end of said body.

2. In an apparatus for removing snow from streets, a scoop-drag adapted to be drawn along the street, said scoop-drag being box-shaped in form and open at one end and provided with wheels or rollers in the bottom thereof, and a wagon having a bed or body open at the rear end, and means whereby the scoop-drag may be drawn into said bed or body, said drag being provided at its opposite sides with rack-bars which are pivoted thereto forwardly of the middle thereof, and the bed or body of the wagon being provided with gear-wheels by which said rack-bars and drag connected therewith may be moved longitudinally of the bed or body of the wagon.

3. In an apparatus for removing snow from streets, a wagon provided with a bed or body open at the rear end and a scoop-drag adapted to be drawn along the street and provided with a removable end-board, means for drawing said drag into the wagon-body, and means for dumping said drag at the rear end of said body.

4. In an apparatus for removing snow from streets, a wagon provided with a bed or body open at the rear end and a scoop-drag adapted to be drawn along the street and provided with a removable end-board, means for drawing said drag into the wagon-body, and means for dumping said drag at the rear end of said body, comprising rack-bars pivoted at the opposite sides of the drag and forwardly of the middle thereof, and gear-wheels connected with the opposite sides of the wagon-bed and operating in connection with said rack-bars.

In testimony that I claim the foregoing as my invention I have signed my name, in presence of the subscribing witnesses, this 29th day of August, 1906.

EMANUEL G. KOHOUT.

Witnesses:
F. A. STEWART,
C. E. MULREANY.